Figure 3:
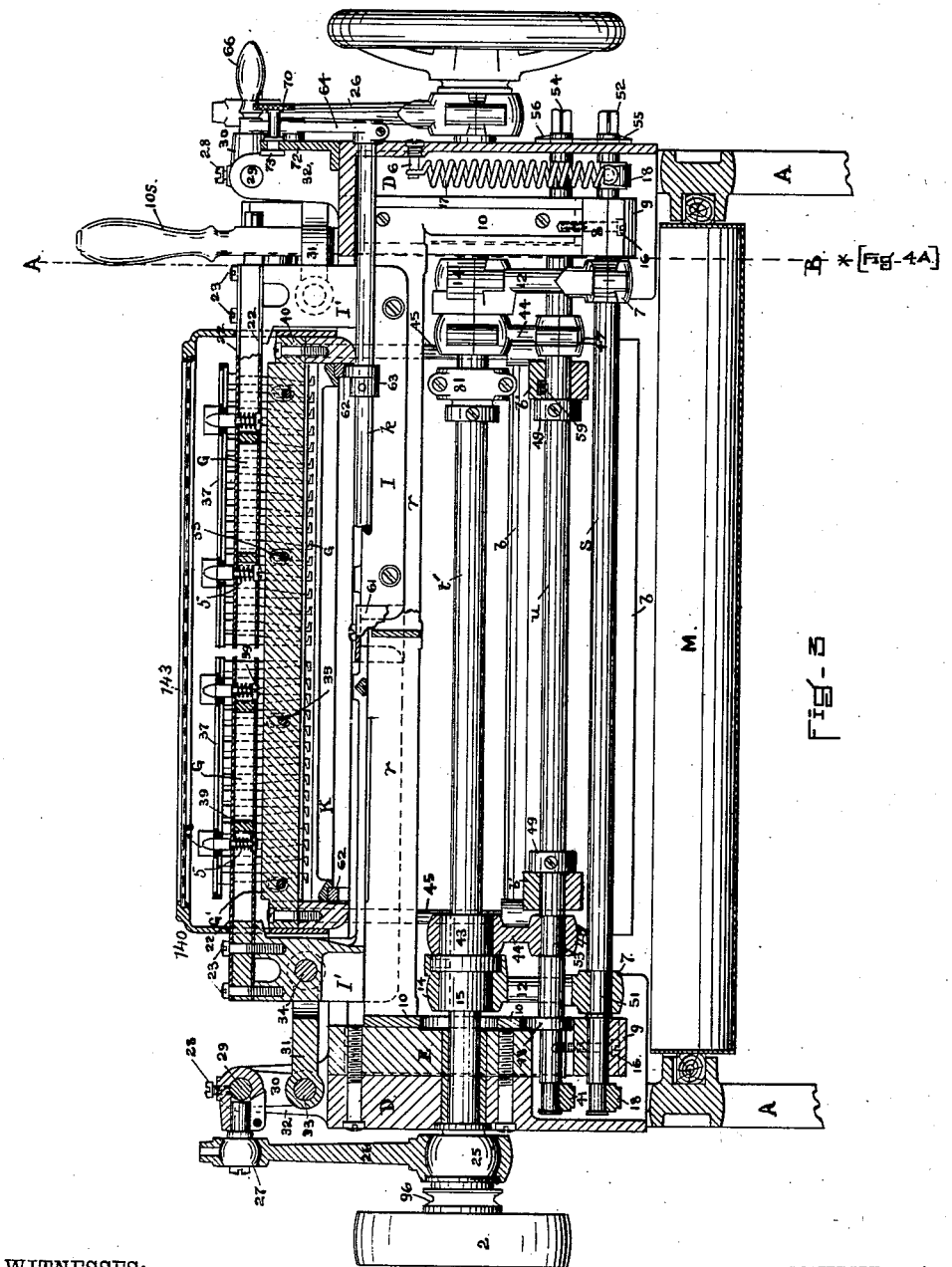

(No Model.) 8 Sheets—Sheet 1.
C. H. WILLCOX & J. RANGE.
MACHINE FOR CLIPPING LACE, &c.
No. 361,563. Patented Apr. 19, 1887.
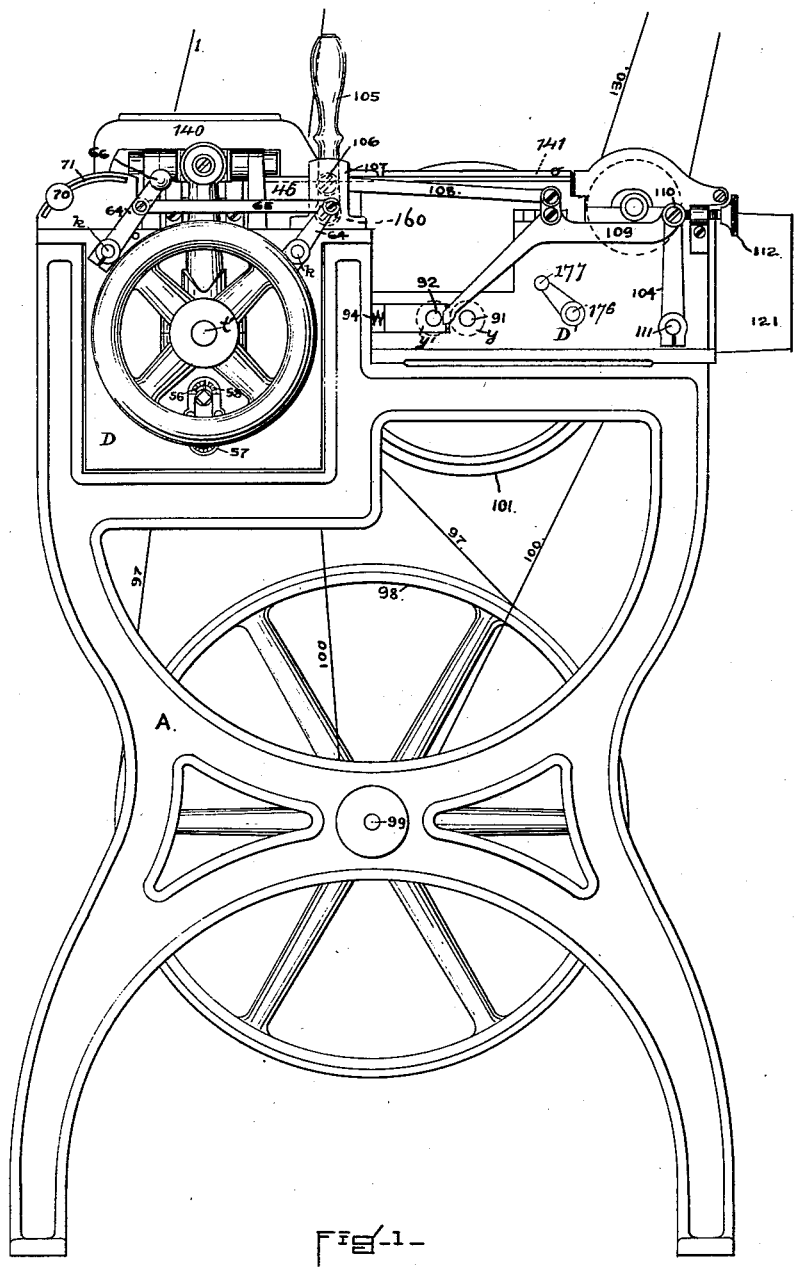
Fig-1-
WITNESSES
INVENTORS (No Model.) 8 Sheets—Sheet 2.
C. H. WILLCOX & J. RANGE.
MACHINE FOR CLIPPING LACE, &c.
No. 361,563. Patented Apr. 19, 1887.
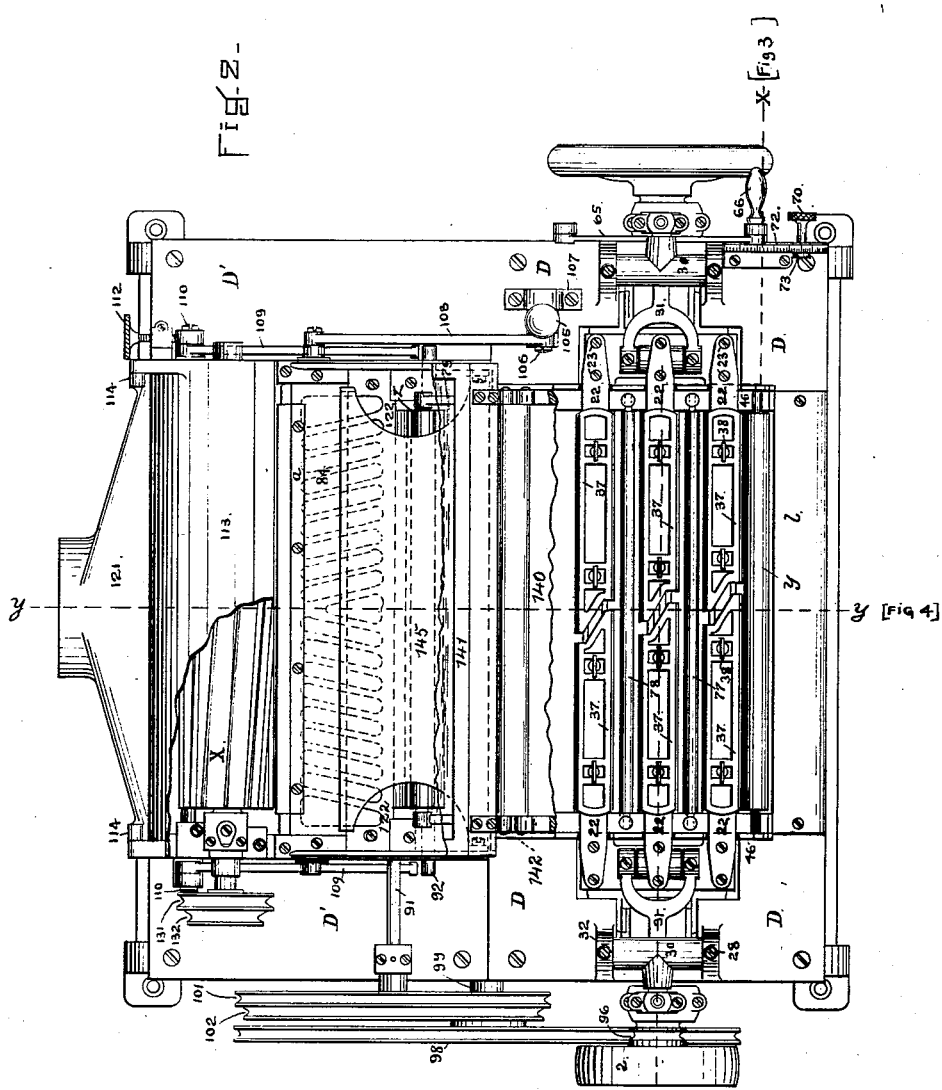
WITNESSES
Philip Mauro
C. J. Hedrick
INVENTORS.
Charles H. Willcox and
James Range
by
A. Pollok
their attorney.

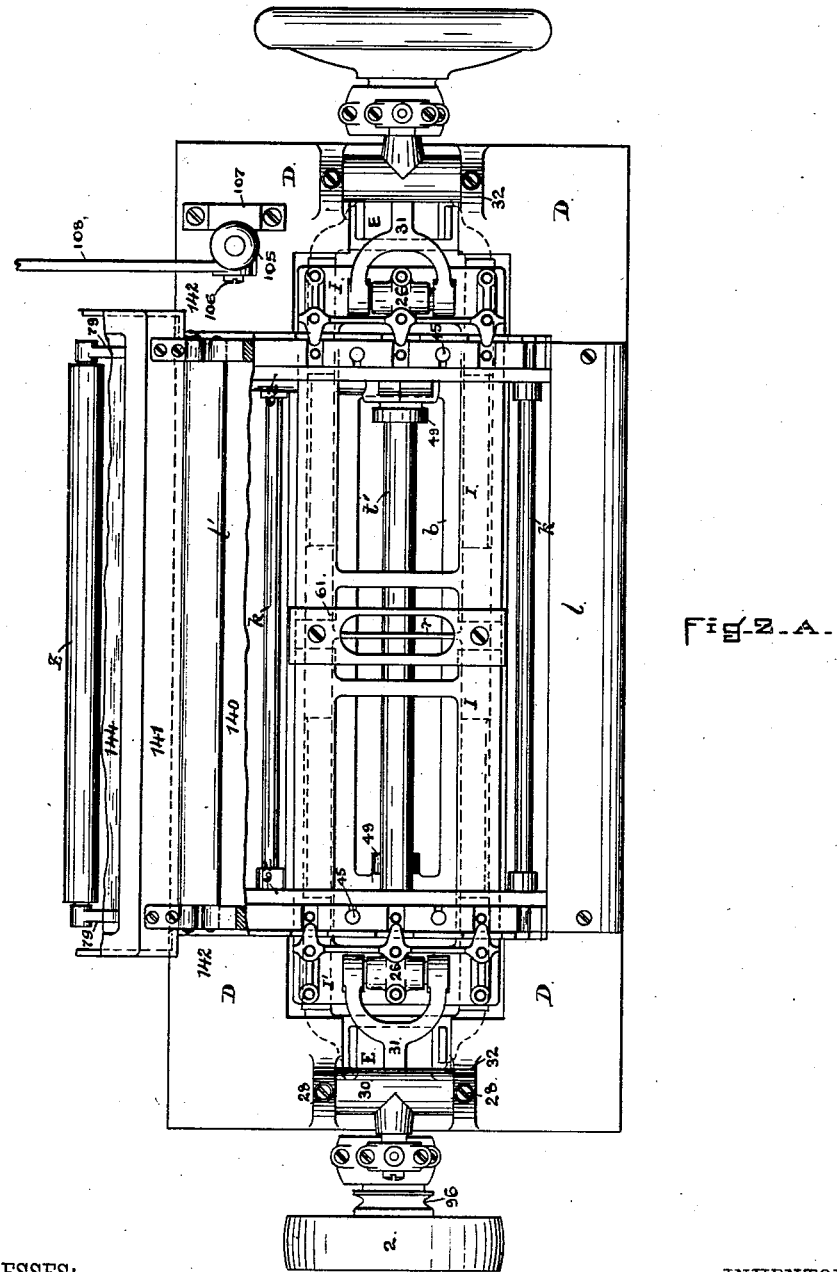

(No Model.) 8 Sheets—Sheet 4.

C. H. WILLCOX & J. RANGE.
MACHINE FOR CLIPPING LACE, &c.

No. 361,563. Patented Apr. 19, 1887.

WITNESSES:
Philip Mauro
C. J. Hedrick

INVENTORS
Charles H. Willcox and
James Range
BY
A. Pollok
Their ATTORNEY (No Model.) 8 Sheets—Sheet 5.
C. H. WILLCOX & J. RANGE.
MACHINE FOR CLIPPING LACE, &c.
No. 361,563. Patented Apr. 19, 1887.
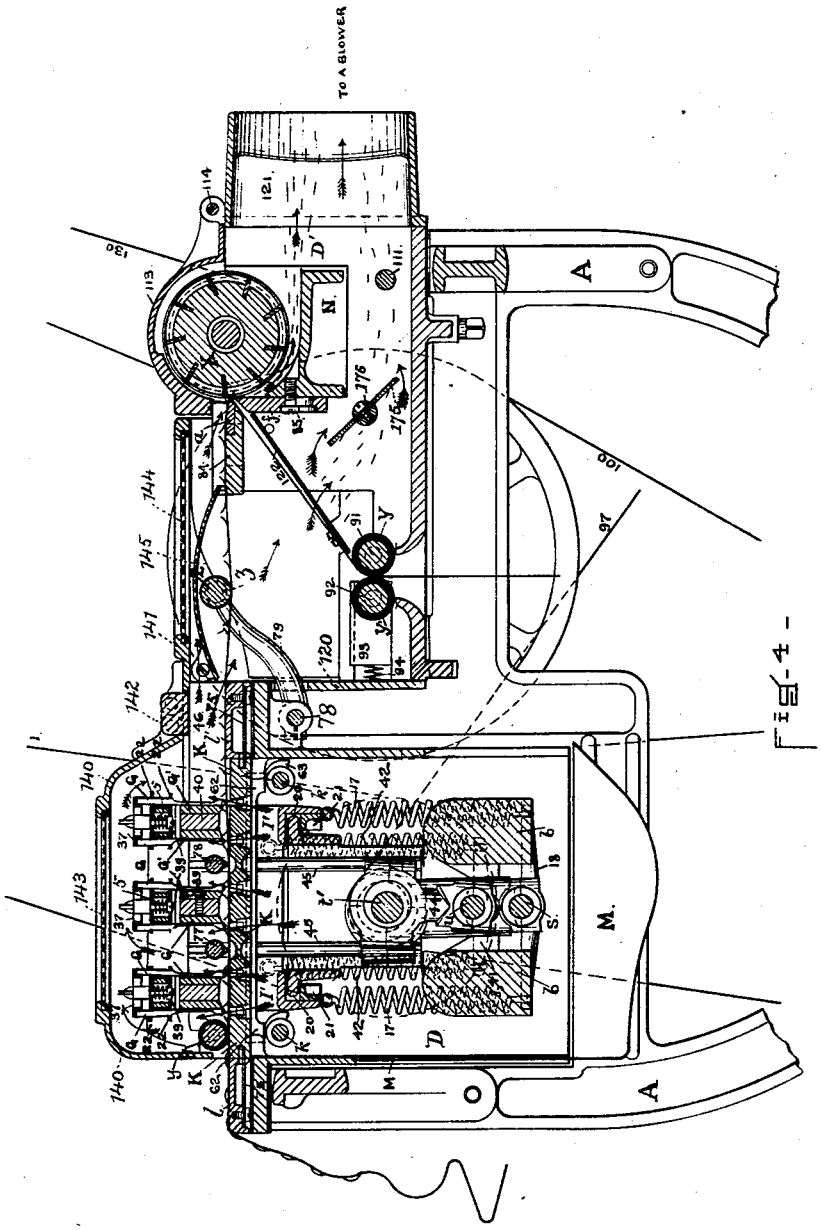
WITNESSES:
Philip Mauro
C. J. Hedrick
INVENTORS
Charles H. Willcox & James Range
BY A. Pollok
their ATTORNEY (No Model.) 8 Sheets—Sheet 6.
C. H. WILLCOX & J. RANGE.
MACHINE FOR CLIPPING LACE, &c.
No. 361,563. Patented Apr. 19, 1887.
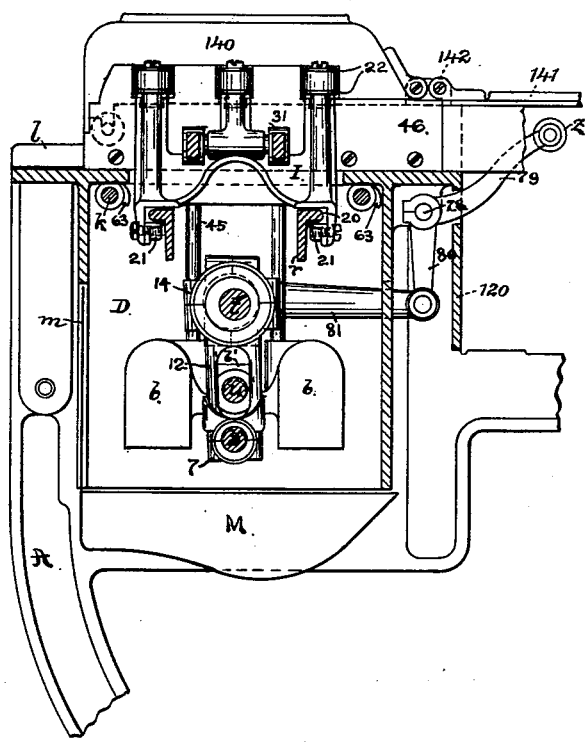
Fig. 4.A.
WITNESSES:
INVENTORS
Charles H. Willcox & James Range
BY A. Pollok
their ATTORNEY (No Model.) 8 Sheets—Sheet 7.
C. H. WILLCOX & J. RANGE.
MACHINE FOR CLIPPING LACE, &c.
No. 361,563. Patented Apr. 19, 1887.
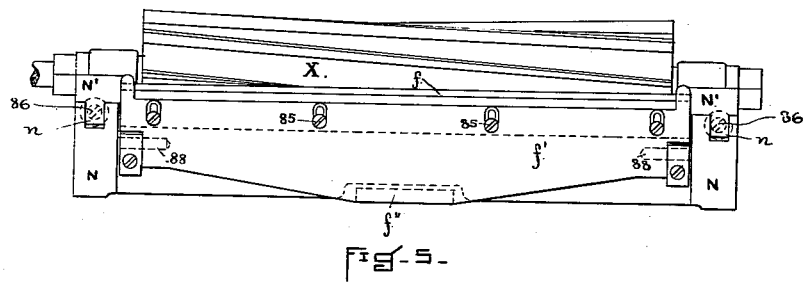
Fig-5-
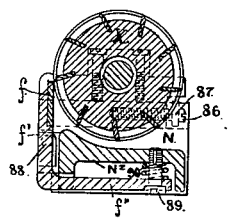
Fig-6-
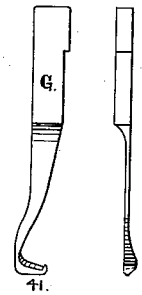
Fig-7-
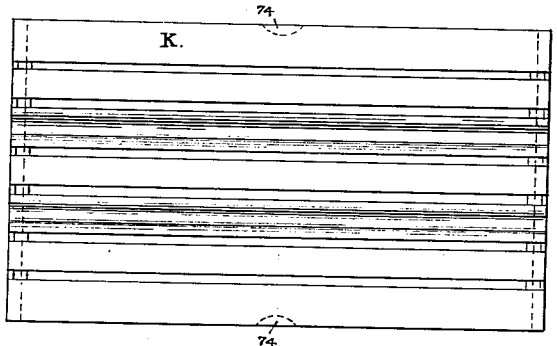
Fig-8-
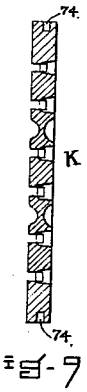
Fig-9-
WITNESSES:
Philip Mauro
C. J. Hedrick
INVENTORS:
Charles H. Willcox & James Range
BY A Pollok
their ATTORNEY

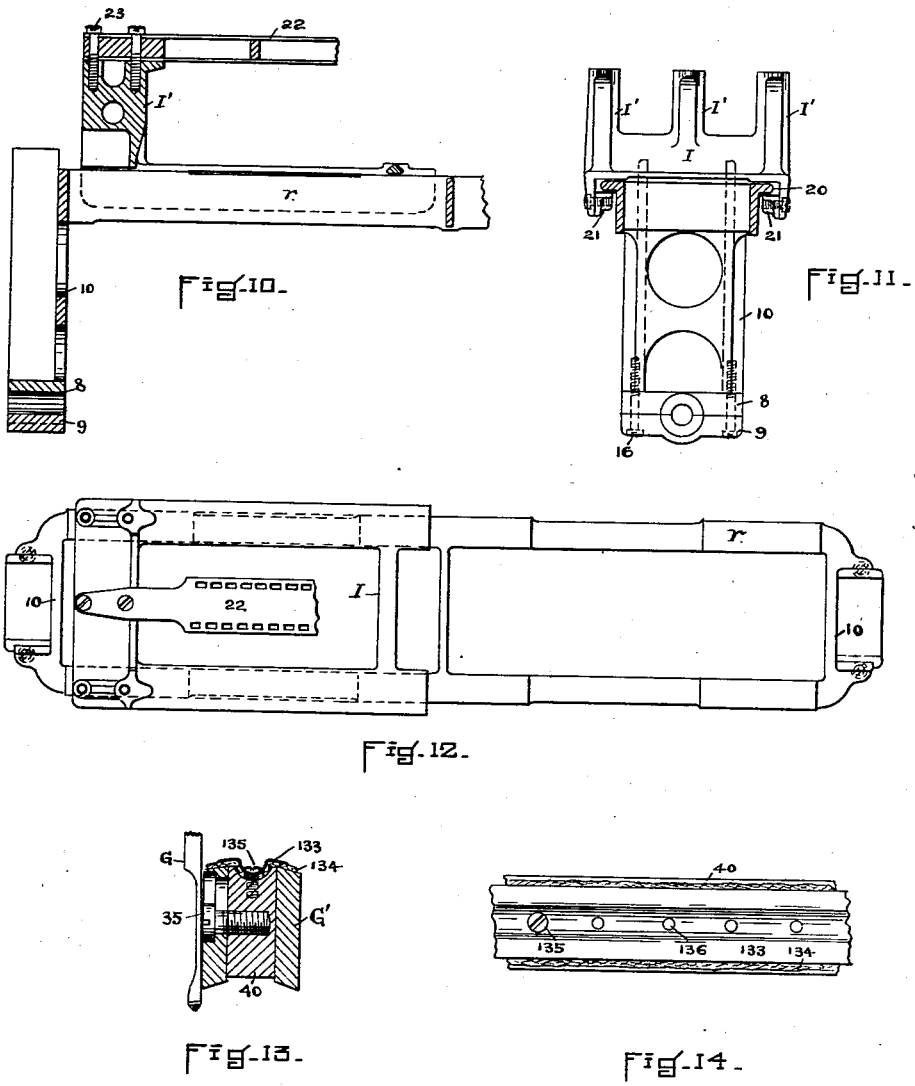

UNITED STATES PATENT OFFICE.

CHARLES H. WILLCOX, OF NEW YORK, N. Y., AND JAMES RANGE, OF NOTTINGHAM, ENGLAND, ASSIGNORS TO THE WILLCOX & GIBBS SEWING-MACHINE COMPANY, OF NEW YORK, N. Y.

MACHINE FOR CLIPPING LACE, &c.

SPECIFICATION forming part of Letters Patent No. 361,563, dated April 19, 1887.

Application filed July 6, 1886. Serial No. 207,179. (No model.)

*To all whom it may concern:*

Be it known that we, CHARLES H. WILLCOX, of New York city, in the county and State of New York, and JAMES RANGE, of Nottingham, England, have invented a new and useful Improvement in Machines for Clipping Lace and other Fabrics, which improvement is fully set forth in the following specification.

This invention has reference to machines for removing from bobbinet and similar fabric the loose threads, called "clips" or "floats," which connect together the figures constituting the pattern of the fabric.

It relates more particularly to machines of the class that employ a series of cutting-pickers, which, as the fabric is fed through the machine, are inserted under the floats or clips, and lift and sever the latter against stationary cutter-blades, and that employ mowing mechanism for cutting or mowing off the clips or floats severed by the picker mechanism.

The present invention consists in certain improvements upon the machine shown and described in Letters Patent No. 353,615, granted to Charles H. Willcox the 30th day of November, 1886, and upon machines of the same type.

Heretofore a series of gangs or rows of cutting-pickers have been arranged to act upon the surface of the lace as it is fed through the machine and to sever the floats or clips, one set of pickers acting at right angles to the movement of the fabric, so as to sever those floats or clips that run parallel, or nearly so, with the fabric, and other sets acting obliquely, so as to be capable of use upon fabric wherein these connecting clips or floats lie in a variety of directions. A sufficient number of pickers arranged so close together as to cover the fabric well and insure the cutting of all the threads have been employed.

As described in the aforesaid patent, the fabric after passing all the pickers was carried by the feed mechanism over the edge of a throat-plate, causing the severed threads to stand out from the fabric, in which position they were mowed off by a revolving cutter acting in connection with a stationary blade. To insure removal of all the threads several cutters were necessary, one being arranged transversely and the others obliquely in the machine, and the fabric passed successively through the several cutters.

The gangs or groups of pickers have heretofore been carried by a movable bed having a vertical reciprocating motion of sufficient amplitude to enable the pickers to lift the fabric and sever them against threads from the fabric and sever them against the stationary blades. The rows of pickers have been carried upon horizontal slides connected with a wrist-plate oscillated on a vertical axis, whereby the several slides, and with them the pickers, were moved back and forth in horizontal planes. The mechanisms were so timed that the pickers moved first down, pressing upon the fabric, then forward, inserting their pointed ends under the floats or clips, then upward, lifting the floats or clips and cutting them, and, lastly, back to the first position.

In the present invention the oblique rows of pickers and the oblique moving-cutters are dispensed with, the machine being adapted to operate only upon the more common patterns of bobbinet, wherein the floats or clips run with the fabric, or nearly so. Three double rows of pickers, arranged so as to break joints, are employed, and the rows are divided near the middle, making two sets comprising each three half-rows, the points of the pickers in the two sets being in opposite directions. The divisions or breaks between the two parts of the several rows are in different lines relatively to the movement of the lace, so that a clip passing between the two parts of the first row would encounter a picker on one of the other rows. The picker at the inner end of each half-row is as close as possible to that of the complementary half-row. To diminish the space between the two, the pickers, instead of being straight, have an offset, the lower part projecting backward from the line of the shank.

As heretofore, the pickers are all carried by a picker-bed, which is reciprocated vertically by means of eccentrics on the main shaft. Instead, however, of having a separate horizontal slide for each row of pickers, but two slides are used, one for each set (three half-rows) of pickers. These slides are reciprocated by eccentrics on the main shaft, outside of the frame of the machine, by means of connecting-rods connected by ball-joints to bell-crank levers, which in turn are connected by links to said slides. Means are, as heretofore, provided for regulating the movement of the picker-bed.

To prevent the jar attending the vertical movement of the picker-bed in the operation of the machine a counter-weight is provided, and is given an opposite movement to that of the picker-bed by means of eccentrics on the main shaft. Springs are provided to balance the picker-bed, and similar springs to balance the counter-weight, and thus take the weight off the operating shaft. The counter-weight is provided with vertical rods, which project up through the bed and constitute guide-rods for the counter-weight. These rods also carry take-up rollers—one between each two double rows of pickers—whereby the fabric is drawn down when the pickers are up, and given out to the pickers as they descend. Adjusting devices are provided for regulating the movement of the counter-weight, and thereby regulating, also, the action of the take-up rollers on the fabric. The lace-plate is perforated or formed with long slots, like a gridiron. These slots take the place of the grooves into which the lace was, in former machines, depressed by the descent of the pickers. The openings in the lace-plate permit the passage of a current of air upward through the lace-plate and through the meshes of the fabric thereon. The current or draft may be effected by an exhaust or suction blower, or by any suitable blower having a supply-pipe leading to the space below the lace-plate. By this means the fine clippings, dust, and other matter which heretofore collected and packed in the grooves of the lace-plate are carried away. The up-current of air also has the important effect of lifting the clips or floats, and thus facilitating the insertion of the pickers under the same. Preferably this part of the invention is carried out by inclosing the top of the machine to form a flue or passage leading to and through the mowing mechanism, and finally out of the machine by a flue at the end thereof, through which all the dust, clips, and other refuse are carried away. A separate exhaust or blower could, of course, be used for the mowing mechanism. When it is not desired to use the draft through the lace-plate, or when the cover is lifted for access to the pickers or for other purpose, in which case the draft through the plate ceases, the perforations in the latter permit clippings to fall through into a trough or drawer arranged to receive them, and which also serves to protect the knees of the operator from drippings of oil. The operating mechanisms for the pickers and counter-weight are arranged on each side of these openings, and the whole machine is so organized as to permit the bulk of the refuse passing through the lace-plate to fall into the trough or drawer. The lace-plate is also provided with means for raising and lowering the same, which both facilitates the introduction and removal of the lace, and also enables the plate to be adjusted to the position to secure the proper depth of action of the pickers.

The three several adjustments specified—viz., for the picker-bed, for the counter-weight, and for the lace-plate—are provided, respectively, with indicating or registering devices, so that the parts can readily be set to the positions found by experience to be best for any particular pattern or style of lace. The feed-rollers are inclosed, and are separated by a partition from the lace clipping and operating mechanism; and the draft created by a suction-blower or equivalent means, as already explained, is directed part between the rotary and stationary cutters of the mowing mechanism, carrying away the mowed-off clips, and part through the plate upon which the lace passes from the cutters to the feed-rollers. This plate is perforated, and the air-draft passing through the lace carries away the fine dust and threads caught in the meshes of the fabric. The draft has also the effect in passing over the lace in front of the rotary cutter of assisting in raising the clips from the fabric and holding them over the stationary blade in favorable position to be mowed off.

The entire mowing mechanism is mounted on a separate frame, so that it can readily be removed from the bed of the machine and replaced by a similar mechanism. By this construction but little time is lost in the operation of the machine when a change is necessary owing to the cutting-blades becoming too dull for use. Certain improvements have also been made in the details of construction of the mowing mechanism, as well as in other parts of the machine, all of which will be hereinafter fully described.

In the accompanying drawings, which form a part of this specification, Figure 1 is a side elevation of a machine constructed in accordance with the invention. Fig. 2 is a plan view thereof with the covers partly broken away. Fig. 2$^A$ is a plan view of the picker mechanism with the covers, pickers, lace-plate, and stationary blades removed. Fig. 3 is a vertical cross section on line $x\ x$, Fig. 2, and partly in elevation. Fig. 4 is a central vertical longitudinal section on line $y\ y$, Fig. 2, looking to the left. Fig. 4$^A$ is a partial longitudinal section on line A B, Fig. 3. Fig. 5 is an elevation, and Fig. 6 a cross-section, of the preferred form of mowing mechanism. Fig. 7 is a detail showing in side and edge views a modified form of picker. Figs. 8 and 9 are views of the lace-plate in plan and cross-section, respectively. Figs. 10, 11, and 12 are details illustrating the picker-bed and picker-slides, and Figs. 13 and 14 are details illustrating means for supplying oil to the pickers.

The side frames, A, support the bed-plate D of the picker mechanism and the bed-plate D' of the mowing mechanism. The main shaft $t'$ of the machine has bearings in the bed D, and is rotated by a belt, 1, on pulley 2. By various devices, hereinafter described, motion is conveyed from this shaft $t'$ to the picker-bed $r$, the picker-slides I, the feed-rollers Y Y', and other parts of the machine.

The picker-bed $r$ is a rectangular casting set inside the bed D. (See Figs. 10, 11, and 12.) It is guided at each end by the vertical grooved pieces 10, which embrace on three sides the stationary guide-bars E, bolted to the frame, and upon which the picker-bed $r$ reciprocates vertically.

The rod or bar $s$ has bearings in blocks 8, secured by screws 9 to the lower ends of the vertical pieces 10, and this rod or bar $s$ is connected with the main shaft $t'$ by connecting-rods 12, having caps 14, which embrace eccentrics 15 on said shaft, and also caps 7, which embrace the rod $s$. By the operation of the eccentrics 15 and their connections the rod or bar $s$ is reciprocated vertically, carrying with it the picker-bed $r$. The weight of the bed and its connected parts is taken off the main shaft by the springs 17, fastened at one end to pins 6, screwed to the frame, and at the other to yokes 18, in which the ends of the rod or bar $s$ rest.

The bed $r$ is provided on each side with an outwardly-projecting lip or flange, 20, (see Figs. 4 and 11,) which is finished on three sides for bearing-surfaces, and forms guides for the picker-slides I. These slides rest upon the bed $r$, and are secured in place on the flanges 20 by gibs 21, screwed to the inside vertical faces of said slides. Each slide I has at its outer end three uprights or posts, I'. To the top of these posts I' are bolted, by means of screws 23, the picker-holders 22, composed each of two steel plates and an intermediate bar, all firmly riveted together. These picker-holders overhang the lace-plate K, as shown. They carry the rows of pickers G, which are inserted vertically in slots in the holders. There are three holders 22 carried by each slide, one for each half-row of pickers.

The slides I are reciprocated by ball-eccentrics 25 on the main shaft outside the frame, from which motion is conveyed by connecting-rods 26 and ball-joints 27 to the oscillating levers 30, turning on stationary pins 29, secured by screws 28 to the uprights 32, forming part of bed-plate D. The levers 30 are connected by pins 33 with the links 31, the other ends of which are forked and embrace bosses on the slides I, to which bosses they are connected by pivot-pins 34. The centers of eccentrics 25 are on the same side of the axis of shaft $t'$, so that the slides I move in opposite directions, and the tendency of one to jar the machine is therefore opposed and neutralized by the motion of the other.

The pickers are arranged in double rows, and the stationary co-operating blades G' are fastened by screws 35 to fixed supports 40, secured firmly to bridge-pieces 46 on bed D and extending across the machine between the two lines of pickers forming the double row. The pickers G are slightly elastic and flexible, so that they press against the stationary blades, the pressure of the pickers in one single row being neutralized by that of the complementary row. The screws 35, fastening the stationary blades to their supports, pass through slots in said blades, (see Fig. 3,) so that the position of the latter may be adjusted. The heads of these screws 35 are below the surface of the blades, so as not to interfere with the action of the pickers.

The pickers G are held in their sockets by plates 37, which bear upon the tops of the pickers. These plates are fastened down by pivoted catches 38, which pass up through slots in the plates 37 and are turned, as shown in the drawings, so as to overlap the edges of the slots and bear upon the plates. To remove the pickers of any row, the catches 38 are given a quarter-turn, bringing them lengthwise of the slots, when the plate 37 can be lifted off and any one or all of the pickers of that half-row withdrawn. This arrangement is adapted to permit the ready and expeditious withdrawal and replacement of the pickers when this is desired. Heretofore (as described in the patent of Willcox, above referred to) the pickers have been held in place by screws fastening the holding-plates to the picker-holders. By the substitution of catches for screws much time is saved in the removal of the pickers when necessary—as for the purpose of sharpening. The shanks of catches 38 are hollow and threaded internally. They engage with screws 39, whose shanks are encircled by spiral compression-springs 5, bearing at one end against the heads of the screws and at the other against the under side of the top plate forming part of holder 22, causing the top plates 37 to bear firmly upon the pickers.

As in former machines, the pickers in each single row are placed opposite the spaces between the pickers of the adjacent row. To further insure the covering of the whole surface of the lace and the cutting of every float, the breaks or divisions in the three double rows are in different lines, as shown in Fig. 2, and the arrangement of the six rows of pickers is such that no two pickers on one side are in the same line running parallel with the fabric.

To diminish to a minimum the width of the break between the two halves of each row, the lower ends of the pickers are preferably bent backward, so that the heel of the pickers on the ends of each half-row will, when the slides approach each other, almost touch. This form of picker is illustrated in Fig. 7, from which it will be seen that the lifting-finger 41 is set somewhat back with respect to the shank, so that the point of the lifting-finger, instead of being in line with the front edge of the shank, comes forward only to about the center line thereof.

In order to diminish the friction and consequent wear caused by the movement of the pickers G in contact with the stationary blades G', it is desirable to keep the adjacent faces of these parts oiled. A very small quantity of oil is sufficient for this purpose, and it is of course important to prevent any oil from dripping upon the lace. This object is accomplished by the means illustrated in Figs. 13 and 14. As there shown the support 40 for the blades G' is grooved or channeled lengthwise on top, and in this groove is laid a strip, 134, of some fibrous material, which is kept saturated with oil. The strip is of sufficient width to overlap the upper edges of blades G'. Above the strip 134 is placed a metal holding-strip, 133, fastened by screws 135 to the support 40. The plate 133 is also grooved, and it is provided with holes 136. A sufficient quantity of oil is poured in the groove of plate 133 and finds access through the holes therein to the fibrous strip 134, by which it is absorbed. Sufficient oil for the contact-surfaces of the pickers and stationary blades finds its way from the edges of strips 134 to the picker and is carried down the latter, while there is no danger of so much oil being supplied in this way as to cause it to drip upon the lace below the pickers.

It has been found in operation that the vertical movement of the picker-bed produces, especially when running at high speed, a violent jar, and in the present machine means have been provided to prevent this, said means consisting, essentially, of a counter-weight, $b$, adapted to oppose and neutralize the motion of the picker-bed and parts carried thereby. This weight $b$ is composed of an open frame, of metal, extending across the machine and connected by cross-pieces $b'$, the weight of the whole being equal to that of the picker-bed and parts carried thereby. The weight $b$ is supported similarly to the picker-bed by a rod, $u$, resting at each end in a yoke, 41, supported by spiral springs 42, of the same size as the springs 17, and attached to the frame in the same manner. The counter-weight is operated by eccentrics 43 on the main shaft $t'$. These eccentrics have the same throw as those that operate the picker-bed $r$; but the centers of the eccentrics 43 are on the opposite side of the axis of shaft $t'$ from eccentrics 15, so that the connecting-rods 44, operated by eccentrics 43, move up when connecting-rods 12 move down, and vice versa. The connecting-rods 44 are connected by caps 47 at their lower ends with the bar $u$, whereby the counter-weight $b$ is reciprocated. The counter-weight carries at each end vertical rods 45, which extend up through the bridge-pieces 46 on the bed of the machine and constitute guides for the counter-weight. These rods also carry and operate the take-up rollers, as hereinafter described.

Collars 49 on bar $u$ bear against the cross-pieces $b'$ and prevent longitudinal movement of the weight. The said rod also has washers 48, which bear against the posts E. The rod $u$ passes through slots in the vertical pieces 10 of the picker-bed, through oblong openings made in the connecting-rods 12, and through slots in guide E. (See Figs. 3, 4ᴬ, 10, and 11.)

For the purpose of adjusting the vertical movement of the picker-bed $r$, the rod $s$ is turned down, at 51, to form eccentrics, where it is embraced by the lower caps, 7, on connection-rods 12, and the end 52 of the rod is squared, so that by a suitable key the rod can be turned in its bearings, so as to vary the vertical movement of the rod and picker-bed. The length of movement of the picker-bed is, of course, always the same; but by the means specified the movement may be made to begin and end at a higher or a lower point, as desired. Rod $u$, carrying the counter-weight, is also provided with eccentrics 53 and with a squared end, 54. The rods $s$ and $u$ are provided with pointers 55 56, respectively, opposite the graduated arcs 57 58, whereby the best positions for different kinds of work can be noted and the parts readily adjusted thereto.

The rotation of the rod $u$ in its bearings is limited by a pin, 59, working in a groove in one of the cross-pieces $b'$, (see Fig. 3,) said groove extending half-way around the rod. Similar means are adopted to limit the movement of rod $s$. The rods are held by the friction of the bearings nearest the squared ends in any position to which they may be adjusted.

The lace-plate K, instead of having grooves for the entrance of the picker-fingers, as heretofore, is slotted entirely through, (see Figs. 4, 8, and 9,) the slots extending lengthwise of the plate the full length of the rows of pickers, and there being one slot for each row. These slots answer the same purpose as the grooves, in that they permit the blunt ends of the pickers to depress the lace, causing the floats or clips to buckle up and the cutting-fingers to be readily and surely inserted under the same; but instead of becoming filled and packed by the action of the pickers with clippings of thread, &c., as was formerly the case, such clippings are carried away by an up-current of air, which passes through the lace-plate and thence out at the rear of the machine. To form a passage or flue for this current of air, the machine is closed on top by the covers 140 and 141, hinged to the bridge-pieces 46 at 142. Cover 140 incloses the picker mechanism, and cover 141 extends over the bed D' of the mowing mechanism as far as the cover 113 of the rotary cutter. The covers have on top glass windows 143 and 144, respectively, through which the operation of the machine can be observed. The front part of cover 140 extends over roller $y$, making therewith a practically-tight joint, and it is constructed to fit as tightly as possible on the sides of the machine, so that the air will be drawn almost entirely from the lower part of the machine through the slots in the lace-plate.

The suction blower or exhaust by which the draft is created is located at any convenient point, and is connected with the discharge outlet or flue 121 at the rear of the machine. When the covers 140 141 are down, the air is drawn from the under part of the machine through the slots in the lace-plate, as indicated by the arrows, Fig. 4. As these slots are directly under the pickers the force of the current is concentrated against the floats or clips at those points and assists materially in lifting them for insertion of the points of the pickers. The air-draft also carries away from the meshes of the lace all dust, lace-clippings, &c., that may be caught therein.

When for any reason the cover 140 or 141 is lifted, the air ceases to pass upward through the lace-plate, in which case the refuse matter may fall through the slots in the plate. The machine is so organized that no working parts are directly below the lace-plate whose operation could be interfered with by such falling matter. The eccentrics on shaft t' are all placed near the ends of said shaft, so as to be out of the way. The two parts of the counter-weight are rounded on top, so that no considerable amount of clippings could be arrested thereby. The ends of the slides I are covered by a plate, 61, bent down at the ends, (see Figs. 2^A and 3,) so that falling particles and clippings cannot lodge between the openings to clog the slides and absorb oil. To catch all such falling particles, as well as drippings of oil, and to protect the knees of the operator therefrom, a trough or drawer, M, is placed at the bottom of the frame. The front part, m, of this drawer extends upward, (see Fig. 4,) so that when in place it closes the front part of the machine.

To prevent the lace as it passes under the take-up roller z from being depressed away from said roller by the force of the air-current, a shield, 145, is placed directly over this roller, so that the air passes over the shield and cannot act upon the lace. The shield 145, however, is cut away at the sides outside the path of the lace, so that part of the air-current may pass down on each side of the lace.

The bed D' of the mowing mechanism is inclosed, being separated from the bed D of the picker mechanism by the partition 120.

The lace-plate K rests at its end upon side bars, 62, inside the space bounded by the bridge-pieces 46. These bars rest upon cams 63 upon the two shafts k, there being two cams on each shaft k, so that the lace-plate K is supported at its four corners. These cams are for the purpose of adjusting the lace-plate vertically to the position best suited for operation, as well as for lowering it to facilitate introduction of the lace. The shafts k have at one end arms 64, (see Fig. 1,) which are connected together by a link, 65. By means of handle 66 both shafts may be turned in the direction either to raise or lower the lace-plate, as desired. As shown in Figs. 1 and 4, the shafts k are turned to bring the lace-plate to its lowest point. In operation the plate would be raised more or less by moving the handle 66 in the other direction until arm 64 comes into contact with stop 70. The shank of this stop passes through a curved slot, 71, in a plate, 72, on the frame, so that it can be adjusted to different positions. The inner end of the shank is threaded, and upon it screws a nut, 73, so that the stop can be secured in any desired position. The top of plate 72 is graduated, (see Fig. 2,) so that the most favorable position of the lace-plate for different kinds of work may be noted.

On each side of the lace-plate is a plate, l l', screwed to the bed-plate D. To the under side of each plate l l' is secured a leaf-spring, 75, said springs 75 entering grooves 74 in the opposite edges of the lace-plate, Figs. 4 and 8. When the plate K is depressed, these springs bear very lightly, or not at all, upon the bottoms of the grooves; but when the plate is raised the springs press firmly upon it, and thus help to hold it steady in operation. To remove the lace-plate, it is depressed to its lowest position, and plate l is unscrewed and removed. The lace-plate can then be slipped out. Above the lace-plate, in front of the first row of pickers, is a smoothing-roller, y.

Between each two double rows of pickers is a take-up roller, 77 78. These rollers are for the purpose of drawing in a sufficient quantity of lace to give up to the pickers, so that there is no danger of tearing the fabric when depressed by the ends of the pickers, into the slots in the lace-plate. These rollers operate when the pickers are lifted from the lace by the rise of the picker-bed, and as the counter-weight moves in opposite directions to the movements of the picker-bed, the take-up rollers 77 78 are carried on the ends of the rods 45, that project upwardly from the counter-weight through openings in bridge-pieces 46, as already explained.

The take-up roller z is such as heretofore used. It is carried on the ends of arms 79, secured to rock-shaft 78, and the latter is oscillated from an eccentric on shaft t' through a connecting-rod, 81, Figs. 3 and 4^A, and lever 80, the latter being rigidly secured to the rock-shaft.

Beyond the roller z, and about on a level with the lace-plate, is a throat-plate, 84, having a steel edge, a, screwed thereto. The throat-plate slides in slots in the bed D', as shown in Fig. 1. As the lace passes around this throat-plate the severed clips are caused to stand out from its surface, and are mowed off by the mowing mechanism. This consists of a rotary cutter, X, and a stationary cutter, f, as heretofore. The blade f is secured by screws 85 to its support. As shown in Fig. 4, the support for the blade is a part of the frame N, and the screws 85 pass through slots, so that the blade f' may be set upward, as required by wear.

The preferred construction of the mowing mechanism and its connected parts is illustrated in Figs. 5 and 6, to which reference is more particularly had in the following description. The entire cutting mechanism is supported by a separate frame, N, which sits in an opening of suitable shape in the bed-plate D', so that the whole mechanism can be readily removed and replaced, which is sometimes desired, as when the cutting-edges become dull. In such case another frame with sharpened blades can be at once inserted and the operation of the machine resumed with little delay.

The rotary cutter X has its bearings in blocks N', supported by the frame N, and held in place thereon by means of tongues $n$, fitting in grooves in the frame N. This gives an independent adjustment of the rotary cutter toward and away from the stationary blade. The movement is effected by adjusting-screws 86, provided with flanges or collars 87, turning in grooves in the stationary part N of the frame, the ends of the screws engaging in threaded sockets in the sliding blocks N'. The support $f'$ of the stationary blade has a horizontal plate or arm, $f''$, extending under the bed $N^2$ of frame N. It turns on journal-pins 88, tapped into the side frames, N. The horizontal arm $f'''$ of the support $f'$ has a perforation, through which passes screw 89, taking into a threaded socket in base $N^2$ of the cutter-frame. Around the shank of screw 89 is a spiral spring, 90, bearing below against the arm or plate $f'''$ and above against the bed $N^2$. The blade $f$ is therefore held against the rotary cutter by spring-pressure. The head of screw 89 forms a stop limiting the movement of the blade in the direction of the rotary cutter X. The cutter X is driven by a belt, 130, on one of the pulleys 131 or 132.

The feed-rollers Y Y' draw the fabric through the machine. Roller Y is mounted on a shaft, 91, having bearings in the bed D', and which receives motion from the main shaft $t'$. Roller Y' is turned on shaft 92 by friction, due to contact with roller Y. Motion is conveyed from small pulley 96 on main shaft $t'$ by belt 97 to the large pulley 98 on shaft 99, and from a small pulley on the latter shaft by belt 100 to one of the pulleys 101 or 102 on shaft 91 of roller Y, whereby the feed-rollers are run at a low speed compared with that of the main shaft. The pulleys 101 and 102 are of different sizes, so that the feed-rollers may be run at a relatively higher or lower speed, as desired. Roller Y' has its bearings in sliding blocks 93, working in slots in bed D', and the said roller is normally held in contact with roller Y by the spiral compression-springs 94. To insert a fresh piece of lace, it is desirable to separate the rollers Y Y', and also to withdraw the throat-plate 84, and both these operations are performed simultaneously by means of devices best shown in Figs. 1 and 2 and now to be described. The lever 105 is pivoted by a screw-pin, 160, to a standard, 107, on bed D. The said lever 105 is connected by screw-pin 106 with a link, 108, and by the latter with a projection of sliding throat-plate 84. When moved the throat-plate carries with it the arms 109, one on each side of the machine. These arms are connected by pins 110 to the vertical arms 104 on shaft 111. The forward ends of arms 109 bear against the sliding blocks 93. Consequently when the lever 105 is moved to the left, Fig. 1, withdrawing the throat-plate 84, the roller Y' is moved away from roller Y by the action of the arms 109 upon the sliding blocks 93, containing the bearings of said roller Y'. An adjustable screw-stop, 112, is provided to limit the movement of these parts in the direction to bring the throat-plate and roller into their working positions.

To remove the cutter-frame and mechanism connected therewith the throat-plate 84 is withdrawn, and the cover 113, which is hinged to the bed at 114, is turned back.

The greater part of the air-current which passes above the shield 145 is led between the rotary and stationary cutters, as indicated by the arrows, carrying away through flue 121 the clips as they are mowed off. The draft at this point has the additional function of assisting in causing the clips to stand out from the fabric, and thus insure their being acted upon by the cutters. To prevent the air passing around over the cutter X, the cover 113 of the latter is made to fit closely for a short distance from the front end, as shown in Fig. 4.

The part of the air-current that passes under the shield 145 at the front and sides thereof is drawn through the inclined plate 122, over which the lace passes to the feed-rollers, and which is perforated with slots, as shown in Fig. 2. The draft passing through the lace removes the cut threads and dust that may be caught in the meshes of the fabric. The slots in plate 122 are oblique, so that every part of the lace will, during part of its traverse over said plate, be exposed to the action of the draft. If these slots were all inclined in the same direction, the projecting threads which form the pattern, acting on the edges of the slots, would tend to divert the fabric from its proper line of movement. To prevent this, half the slots are inclined in one direction and half in the other.

To regulate the amount of draft passing through the lace on plate 122, and concentrate it more or less at the mowing mechanism, a damper, 175, supported on a shaft, 176, having bearings in bed D', is placed just below the mowing mechanism. (See Fig. 4.) This damper can be adjusted by a handle, 177, Fig. 1. When closed the damper 175 strikes stationary blade $f$ and the bottom of bed D'. All the air is then drawn over throat-plate 84. When this occurs there is a tendency for air to pass upward between the back of blade $f$ and the lace above plate 122, which, meeting the severed clips, tends to keep them from turning downward between the throat-plate and stationary blade, and with the assistance of the draft over the edge of the stationary cutter holds the clips in the best position to be cut by the rotary cutter.

It is obvious that modifications may be made in the details of construction and arrangement of parts without departing from the spirit of the invention, and that parts of the invention may, if desired, be used without others.

Having now fully described our said invention and the manner in which the same is or may be carried into effect, what we claim is—

1. In a lace-clipping machine, the combination, with the lace-plate and feed mechanism, of two or more parallel double rows of pickers divided near the middle, the breaks or divisions in the several rows being in different lines relatively to the movement of the fabric, substantially as described.

2. The combination, with the lace-plate and feed mechanism, of one or more rows of pickers divided into two sets working in opposite directions, and the supporting and operating mechanism for said pickers, the latter being formed near their lower ends with a backward projection or offset, substantially as described.

3. The combination, with the pickers and picker-slides, of the picker-holders carried thereby and provided with openings or sockets for the insertion of the pickers, the top plates for bearing upon the ends of said pickers, and the catches for securing said plates in position and readily releasing them when the removal of the pickers is desired, substantially as described.

4. The combination, with the picker-holders having sockets for the insertion of the pickers, of the pickers, the top plates, the catches, and the springs causing the top plates to bear firmly upon the ends of the pickers, substantially as described.

5. The combination, with the frame, of a lace-plate having perforations through which the severed clips may pass, a series of cutting-pickers above said plate, picker-slides carrying said pickers, a shaft located beneath said lace-plate, eccentrics on said shaft outside said frame, and operating-connections between said eccentrics and said picker-slides, substantially as described.

6. The combination, with the pickers, of the lace-plate having slots or openings extending through it and a clear space below it, so that clippings and other matter can pass through said plate and clear said slots or openings, substantially as described.

7. The combination, with the pickers, of the lace-plate having slots in line with the several rows of pickers and extending entirely through said plate, said slots being open on top and bottom, so that clippings and like matter may pass through the same, substantially as described.

8. The combination of the pickers, the slotted lace-plate, and the flue above said plate communicating with a blower or means for creating a draft through the openings in said plate, substantially as described.

9. The combination of the pickers, the lace-plate having slots in line with said pickers, and the cover inclosing the top of the machine and forming a flue or air-passage, substantially as described.

10. The combination, with the slotted lace-plate and picker mechanism, of the hinged cover inclosing said mechanism and forming an air flue or passage, substantially as described.

11. The combination, with the picker mechanism and mowing mechanism, of the slotted lace-plate, the cover or covers inclosing the top of the machine, the take-up roller, and the shield arranged above said roller, substantially as and for the purpose described.

12. The combination, with the pickers and means for reciprocating the same vertically, of the lace-plate and means for adjusting the same to different heights, substantially as described.

13. The combination, with the lace-plate, of the shafts supporting the same, cams on said shafts, and means for turning said shafts by hand to raise or lower said plate, substantially as described.

14. The combination of the lace-plate, supporting-shafts, hand-lever and cams and connections for adjusting said lace-plate, and registering or indicating devices, substantially as described.

15. The combination, with the lace-plate and adjustable support therefor, of a spring or springs arranged to bear firmly on the lace-plate when raised to its operative position, but to relax their pressure when said plate is lowered, substantially as described.

16. The combination, with the slotted or perforated lace-plate, of the drawer or receptacle below the same, substantially as described.

17. The combination, with a vertically-reciprocating part of the machine—such as the picker-bed—and the shaft from which it receives motion, of a counter-weight, and connections operated from said shaft for reciprocating the said counter-weight at the same speed as said vertically-reciprocating part, but in opposite directions, substantially as and for the purposes set forth.

18. The combination, with the picker-bed, the main shaft, and the eccentrics and connections for reciprocating the same vertically, of the counter-weight, and the eccentrics and connections for reciprocating said counter-weight at the same speed as said picker-bed, but always in opposite directions, substantially as described.

19. The combination of the main shaft, the picker-bed, eccentrics on the main shaft, and connections for reciprocating said picker-bed, the counter-weight eccentrics, also on the main shaft, connections for reciprocating the same in opposite directions to the movement of said picker-bed, and springs for relieving said main shaft of the weight of said picker-bed and counter-weight, substantially as described.

20. The combination, with the picker-bed, pickers carried thereby, counter-weight, and means for reciprocating said picker-bed and counter-weight in opposite directions, of take-up-rollers carried by said counter-weight for drawing in the fabric when the pickers ascend and giving it out as they descend, substantially as described.

21. The combination of the pickers, picker-bed, counter-weight, means for reciprocating said bed and counter-weight in opposite directions, take-up rollers carried by and movable with said counter-weight, means for adjusting the movement of the latter, and registering or indicating devices, substantially as described.

22. The combination, with the bed D', having an opening therein, the throat-plate supported by said bed adjacent to said opening, a frame corresponding in shape to said opening and removably supported therein, and a rotary and a stationary cutter, both carried by said frame, substantially as described.

23. The combination of the cutter-frame, the rotary cutter, the stationary blade, the support therefor hung vertically on journal-pins tapped into the cutter-frame, and a screw for adjusting said support, substantially as described.

24. The combination, with the rotary cutter, of the stationary blade, the pivoted adjustable support therefor, the adjusting-screw, and the spring for holding the stationary blade in its operative position with yielding pressure, substantially as described.

25. The combination, with the throat-plate and the feed-rollers, one of which has bearings in movable blocks, said plate and block being connected, as specified, of a hand-lever connected with the said throat-plate, as by a link, whereby said throat-plate and feed-roller may be moved simultaneously, substantially as described.

26. In a lace-clipping machine, the combination of the picker mechanism, the mowing and feed mechanism, the inclosed supporting-bed separated by the partitions separating the same from the picker mechanism, and the flue or passage adapted for connection with an exhaust for carrying the mowed-off clips out of the machine, substantially as described.

27. The combination of the picker mechanism, the mowing mechanism, the slotted lace-plate, a flue or passage above said plate leading to the mowing mechanism, and a flue beyond said mowing mechanism adapted to be placed in communication with an exhaust or suction-blower, whereby an air-draft may be created through said lace-plate and mowing mechanism, substantially as described.

28. The combination, with the inclosed bed, of the mowing mechanism, said bed being provided with a flue or outlet adapted for connection with a blower, whereby air may be drawn between the cutting-blades, substantially as and for the purpose described.

29. The combination, with the cutters and feed-rollers, of the plate upon which the lace passes from the cutters to the feed-rollers, said plate being provided with openings or air-passages, substantially as described.

30. The combination, with the inclosed bed, of the rotary cutter, the stationary cutter, the flue adapted for connection with a blower, whereby air may be drawn between said cutters, the perforated plate over which the lace passes from the cutters, and the damper below the cutters for regulating the passage of air through said plate, substantially as described.

31. The combination, with the cutting-pickers and the stationary blades, of the fibrous strip for supplying oil to the contact-surfaces, substantially as described.

32. The combination of the stationary blades, the support therefor, and the cutting-pickers, the support for the stationary blades being grooved to form an oil-receptacle, substantially as described.

33. The combination, with the cutting-pickers, the stationary blades, and their support having a grooved top, of the fibrous strip and the trough-like perforated metal strip, holding said fibrous strip in place on said support, substantially as described.

In testimony whereof we have signed this specification in the presence of two subscribing witnesses.

CHAS. H. WILLCOX.
    JAMES RANGE.

Witnesses:
 GILMAN E. JOPP,
 THOMAS A. MILLETT.